3,793,287
MIXTURES OF POLYTETRAFLUOROETHYLENE AND FILLERS AND THEIR MANUFACTURE
Herbert Fitz and Alfred Steininger, Burgkirchen (Alz), Germany, assignors to Farbwerke Hoechst Aktiengesellschaft vormals Meister Lucius & Brüning
No Drawing. Continuation of abandoned application Ser. No. 865,963, Oct. 13, 1969. This application Jan. 7, 1972, Ser. No. 216,307
Claims priority, application Germany, Oct. 22, 1968, P 18 04 409.2
Int. Cl. C08f 45/04
U.S. Cl. 260—41 A        9 Claims

ABSTRACT OF THE DISCLOSURE

The invention provides mixtures of polytetrafluoroethylene and fillers which are prepared in the presence of specific cationic substances, which mixtures are suitable for paste extrusion. Even with a filler content of up to 60% by volume the mixtures have excellent paste extrusion properties and are especially suitable for the manufacture of extremely thin profiles. The invention also provides a process for the manufacture of the said mixtures.

---

This application is a continuation of Ser. No. 865,963 filed Oct 13, 1969 and now abandoned.

The present invention relates to mixtures of polytetrafluoroethylene and fillers from which, after the addition of suitable lubricants, for example hydrocarbons, profiles can be moulded at room temperature with hydraulic extruders, such as tubes, bands, strands, filaments, wire coatings and cable coatings. Moulding of mixtures of polytetrafluoroethylene and lubricants is known in the art and is used in practice under the definition of "paste extrusion."

As compared with other plastics materials, polytetrafluoroethylene is distinguished by a valuable combination of properties, for example usability in a wide range of temperature of from −200° C. to +260° C., resistance to almost all chemicals, excellent electric, anti-adhesive and sliding properties. To improve some less favourable properties, for example the compressive strength or the thermal conductivity, fillers may be added to the polytetrafluoroethylene, for example glass wool, asbestos, copper, or brass.

In U.S. Pat. 2,593,582, for example, it has been proposed uniformly to disperse fillers or pigments in a dispersion of pulverulent polytetrafluoroethylene suitable for being extruded in the form of a paste and to coagulate the said fillers or pigments together with the polytetrafluoroethylene.

The method of the joint coagulation has found, however, little use in practice as it can only be performed with a limited number of fillers, such as carbon black, graphite, or silicones. With fillers having especially interesting properties, such as glass fibers and metal powder, which are readily wetted with water and/or have a high specific gravity, separation into the components is observed when polytetrafluoroethylene and filler are jointly coagulated.

According to the methods proposed in Canadian Pats. 566,352 and 681,547 homogenous mixtures can be prepared by maintaining as high as possible the concentration of solid of the polytetrafluoroethylene dispersion (for example at 60%) and bringing about coagulation by grinding in a ball mill. Owing to the low proportion of the aqueous phase the tendency to separate of the two solids polytetrafluoroethylene and filler is rather low.

The serious drawback of this mode of manufacture of mixtures suitable for paste extrusion is, however, that by the intensive mixing in the presence of a relatively low proportion of aqueous phase the coagulated polytetrafluoroethylene is subjected to important mechanical forces, whereby the porous structure of the polytetrafluoroethylene in the mixture with fillers is destroyed, which structure is a prerequisite for good paste extrusion properties. A high content of pores, i.e. a large internal surface, is essential for paste extrudable polytetrafluoroethylene powders to ensure a good absorption and distribution of the lubricant present during extrusion.

According to the experiences gained with polytetrafluoroethylene without fillers and suitable for paste extrusion the best results with respect to the content of pores of the coagulated powder are obtained when polytetrafluoroethylene dispersions of 5 to 20% strength are allowed to coagulate under very mild conditions, that is to say with as little mechanical stress as possible. Under these optimum coagulation conditions it is impossible, however, to incorporate fillers such as glass fibers or metal powder, by joint coagulation, or the incorporation is at least greatly impeded in that under the specified conditions only a minor proportion of the added filler is incorporated into the polytetrafluoroethylene coagulum. The larger proportion of the filler having a higher specific gravity accumulates at the bottom of the stirring vessel while the flocculent polytetrafluoroethylene powder floats on the liquid medium.

Attempts have been made to prepare in dry manner mixtures of polytetrafluoroethylene and filler capable of being extruded in the form of a paste. It has been found, however, that mixtures of this type have unsatisfactory properties for paste extrusion. Owing to the relatively large size of the coagulated polytetrafluoroethylene powder (average grain size 500 to 800 microns) the said mixtures are only little homogeneous. A comminution of the polytetrafluoroethylene powder for mixing purposes is not possible because the required mechanical forces would destroy the paste extrusion properties as described above.

The present invention provides mixtures of polytetrafluoroethylene and up to 60% by volume, calculated on the polytetrafluoroethylene, of at least one filler, the powdery particles of the mixture having an average particle size from 0.2 to 2 mm. and consisting of homogeneous agglomerates of filler particles having a particle size preferably of up to 300 microns or a fiber length preferably of up to 1500 microns and polytetrafluoroethylene particles having a particle size of 0.1 to 0.5 micron.

The present invention also provides a process for the manufacture of the said mixtures by suspending the filler in an aqueous polytetrafluoroethylene dispersion and subsequently jointly coagulating the two components which comprises bringing about coagulation of the dispersion in the presence of cationic substances, preferably amine or diamine salts which contain at least one branched or straight-chain, aliphatic or araliphatic radical having 12 to 30 carbon atoms.

The mixtures of the invention are so homogeneous that even with high filler contents of 60 parts by volume of filler for 100 parts by volume of polytetrafluoroethylene very good paste extrusion properties are ensured.

Suitable cationic substances (agents rendering hydrophobic) according to the invention are especially organic amine or diamine salts containing at least one hydrocarbon radical, preferably at least one straight chain or branched aliphatic or araliphatic radical having 12 to 30 carbon atoms, preferably 12 to 22 carbon atoms.

The hydrogen atoms of the hydrocarbon chain may be replaced wholly or partially by halogen atoms, such as chlorine and fluorine. Especially good results are obtained with organic amine or diamine salts which contain one of the aforesaid radicals, for example the acetic acid salts of lauryl amine, stearyl amine and behenyl amine, the benzoic acid salt of oleyl amine and the diacetate of stearylpropylene-diamine.

The cationic substances used according to the invention have an electrophilic center causing a sufficient solubility in water as well as a hydrophobic zone with hydrophobizing effect.

With the electrophobic end, i.e. the positive charge of the ammonium group, the said cationic substances firmly adhere to the hydrophilic surface of the filler having a negative charge, whereby the surface of the filler acquires hydrophobic properties, simultaneously the adhesion on the coagulated polytetrafluoroethylene particles is improved.

To confer upon the filler in the dispersion hydrophobic properties amounts of from 0.2 to 3 parts of cationic compound are sufficient for 100 parts by weight of filler. In the polytetrafluoroethylene dispersion of 5 to 20% strength the cationic substance is dissolved while the filler is suspended.

The hydrophobization of the filler ensures that during the joint coagulation the precipitating polytetrafluoroethylene is absorbed on the hydrophobic filler and a very homogenous mixture is obtained. The precipitation may be carried out under conditions which are optimum with regard to the paste extrudability without the slightest separation into the components being observed.

As fillers there are used in the process of the invention especially inert inorganic substances of fibrous or granular structure having a hydrophilic surface, such, for example, as glass fibers or powders of metals, metal alloys, metal oxides or metal sulfides, more particularly iron powder, nickel powder, steel powder, brass powder, or powdery cadmium oxide, lead oxide, bismuth oxide, or molybdenum disulfide. It is also possible to use asbestos or whiskers, i.e. minute hair-like crystals of certain metals. Mixtures of suitable fillers may also be used. In this case, fillers having a hydrophobic surface may concomitantly be used as filler component.

It is surprising that even heavy fillers, for example bronze powder, are embedded in the polytetrafluoroethylene coagulum in such a satisfactory manner that in the following processing steps, such as washing and drying, or when the finished mixture is handled, separation into the components does not occur.

In contradistinction thereto, it could have been expected that on washing the coagulum consisting of polytetrafluoroethylene and filler at least part of the filler surface would become hydrophilic again owing to dissolution or desorption of the water-soluble cationic substance and that stirring of the mixture in the wash water would involve separation into the components and it is very surprising that this is not the case.

A mixture having good paste extrustion properties and consisting of polytetrafluoroethylene and filler may be prepared as follows: The powdery filler is homogeneously stirred into a polytetrafluoroethylene dispersion having a strength of 5 to 20%. The cationic compound can be dissolved in the dispersion before the introduction of the filler or it may be added subsequently in the form of a solution, for example an aqueous or alcoholic solution, to the suspension of the filler in the polytetrafluoroethylene dispersion. The polytetrafluoroethylene is then precipitated together with the filler by further stirring the suspension. The homogeneous precipitate, the discrete particles of which consist of a homogeneous mixture of polytetrafluoroethylene and filler is thoroughly stirred with water two or three times. After each washing the aqueous medium is separated. The washed precipitate is separated by filtration and dried in usual manner.

The pulverulent mixture of polytetrafluoroethylene and filler thus obtained is then admixed with a suitable lubricant whereupon it can be moulded by the known paste extrusion process into the most different profiles. After elimination of the lubricant the moulded articles obtained can be used, either with or without sintering, for the intended purpose.

The mixture of polytetrafluoroethylene and filler according to the invention permits the manufacture of shaped articles of extremely thin profiles, for example thin-walled tubes, filaments and the like having a wall thickness or diameter of less than 1 millimeter from mixtures having a relatively high filler content of up to 60 parts by volume for 100 parts by volume of polytetrafluoroethylene. With respect to the different densities of the fillers the specification in parts by volume is preferred to parts by weight for comparing and evaluating purposes.

Hence, it follows that the mixtures of polytetrafluoroethylene and filler according to the invention open up numerous new fields of application such as: self-lubricating, abrasion-resistant wires and cables, for example Bowden wires, self-lubricating parts of plastics bearings such bearing housings, sealing elements of any type, small parts for electronic installations, abrasion-resistant wire coatings.

The following examples illustrate the invention. In order to judge correctly the quality of the mixtures of the invention they were compared with (a) pure polytetrafluoroethylene powder prepared from the same dispersion under identical conditions and extruded under the conditions specified in Example 1,
(b) dry mixtures of the aforesaid polytetrafluoroethylene powder with varying proportions of fillers, prepared by premixing for 20 minutes in a glass bottle on a pair of rolls. The dry mixtures were likewise extruded under the specified conditions.

The tests revealed that polytetrafluoroethylene/filler mixtures having a filler content of about 30 parts by volume for 100 parts by volume of polytetrafluoroethylene could be compared in their paste extrusion properties (extrusion pressure, visual evaluation of extrusion) with mixtures prepared in dry manner and containing only 10 parts by volume of filler for 100 parts by volume of polytetrafluoroethylene. It is thus possible to triple by the process of the invention the filler content as compared with mixtures prepared in dry manner and to improve considerably certain properties, for example compressive strength and thermal conductivity. This result is especially surprising because in neither mixing process the pore structure of the polytetrafluoroethylene is modified in a manner unfavorable for paste extrusion, so that the difference can only be attributed to the considerably better homogeneity of the invention.

A further advantage of the mixtures of polytetrafluoroethylene and filler according to the invention resides in the fact that up to a filler content of 60 parts by volume for 100 parts by volume of polytetrafluoroethylene, preferably 40 to 50 parts by volume for 100 parts by volume of polytetrafluoroethylene the paste extrusion properties are only insignificantly reduced as compared with pure polytetrafluoroethylene made from the same dispersion.

The paste extrusion properties of the mixtures of polytetrafluoroethylene and filler according to the invention were determined as follows:

Gasoline having a boiling point in the range of from 180 to 200° C. was added to about 150 grams of the pulverulent polytetrafluoroethylene/filler mixture. In each case 18% by weight of gasoline were used, calculated on the weight of the polytetrafluoroethylene contained in the mixture. Thorough mixing was brought about by rolling the respective mixture in a 500 ml. glass bottle for 20 minutes at room temperature on a pair of rolls. The mixture was then allowed to stand for 1 hour and moulded into a preform under a pressure of 50 kp./cm.² for 2 minutes. The preform was inserted into an extrusion cylinder and extruded through an annular nozzle to give a tube under the following conditions:

Dimensions of extrusion cylinder Z: 40 x 5.0 mm.$\phi$
Dimension of annular nozzle D: 5.8 x 5.0 mm.$\phi$ $$\text{Reduction ratio} = \frac{\text{cross sectional area Z } 180}{\text{cross section of area D}}$$

opening angle of the cone between nozzle and extrusion cylinder:

Length of annular nozzle: 8 mm.
　　Temperature of nozzle: 45° C.
　　Issuing rate of extruded article: 2 m./min.

At the issue from the nozzle the quality of the entire surface of the tube having a length of approximately 15 meters was tested. The quality of the surface and hence, of the extrusion was evaluated as follows:

(1) unobjectionable
(2) surface partially scaly
(3) surface with moulding defects
(4) tube tears off under proper weight During extrusion the extrusion pressure was recorded. The extruded tubes were dried at 150° and sintered for 5 minutes at 380° C. The finished tubes were tested as to their strength.

EXAMPLE 1

1000 grams of water in which 2.4 grams of the acetic acid salt of lauryl amine had been dissolved were added to 1000 grams of a polytetrafluoroethylene dispersion of 24% strength by weight in which the dispersed particles had an average size of about 0.3 micron. With a propeller mixer with three blades each having a radius of 3 cm. and in the presence of a deflector 80 grams of glass fibers having a fiber diameter of 10 microns and a medium length of 250 microns were stirred into the dispersion at a speed of 1200 revolutions per minute. Coagulation took place after about 4 minutes. Thereafter, the mixture was stirred for a further 10 minutes at a speed of 600 revolutions per minute. A homogeneous precipitate formed which floated on the surface of the liquid medium. The liquid medium was withdrawn at the bottom of the vessel, water was added and the precipitate was stirred for 2 minutes with the wash water whereupon the wash water was eliminated. The washing step was repeated twice and the filtered coagulum was dried in usual manner. The very good paste extrusion properties of the mixture of polytetrafluoroethylene and glass fibers obtained consisting of 25 parts by weight of glass fibers and 75 parts by weight of polytetrafluoroethylene are indicated in the table. In the table there is also given the composition of the mixture in parts by volume.

EXAMPLE 2

1000 grams of the polytetrafluoroethylene dispersion of Example 1 were diluted with water in a ratio of 1:1 and into the diluted dispersion 80 grams of the glass fibers specified above were stirred in under the conditions of Example 1. After 1 minute, 0.6 gram of stearylpropylene-diamine diacetate dissolved in 10 grams of ethanol was added to the suspension of filler in the polytetrafluoroethylene dispersion. After a further 2 minutes coagulation took place. The homogeneous coagulum was treated as described in Example 1. The paste extrusion properties and the properties of the extrudates are indicated in the table.

EXAMPLE 3

Under the conditions specified in Example 2, a mixture of 64 grams of glass fibers and 16 grams of finely powdered graphite was stirred into 2000 grams of a 12% polytetrafluoroethylene dispersion and a solution of 0.8 gram of behenylamine acetate (n-$C_{22}$-amine) in 10 grams of ethanol was added. Coagulation occurred after stirring for a further 1½ minutes at a speed of 1200 revolutions. After having reduced the speed of the stirrer to 600 revolutions per minute the uniformly gray precipitate was futher treated as described in Examples 1 and 2. The mixture obtained had very good paste extrusion properties (cf. table).

COMPARATIVE EXAMPLE 1

Under the conditions specified in Examples 1 to 3 a 12% dispersion of polytetrafluoroethylene was allowed to coagulate without addition of a filler. The polytetrafluoroethylene powder obtained was extruded under the same conditions as the mixtures with fillers of the preceding examples. The values indicated in the table are a measurement for the quality of the polytetrafluoroethylene dispersion which was used for all experiments described in the examples.

COMPARATIVE EXAMPLES 2 TO 4

150 grams of polytetrafluoroethylene powder prepared as described in comparative Example 1 were mixed in a 500 ml. glass bottle with varying amounts of glass fibers of the type used in Examples 1 to 3.

Comparative Example 2=16.7 grams of glass fibers, 10% by weight, calculated on the mixture
Comparative Example 3=26.4 grams of glass fibers, 15% by weight, calculated on the mixture
Comparative Example 4=37.5 grams of glass fibers, 20% by weight, calculated on the mixture The respective mixtures were mixed for 20 minutes by rolling on a pair of rolls and extruded under the conditions specified in Examples 1 to 3. The results are indicated in the table. The mixture of comparative Example 4 containing 20% of glass fibers could not be extruded. The mixture of comparative Example 2 containing 10% of glass fibers had slightly better paste extrusion properties than the mixtures of Examples 1 to 3 according to the invention.

EXAMPLE 4

A solution of 1.2 grams of stearyl amine acetate in 1000 grams of water was added to 1000 grams of the polytetrafluoroethylene dispersion of 24% strength as used in Examples 1 to 3 and 360 grams of bronze powder of spherical shape having a particles diameter of 60 microns on the average were stirred into the dilute dispersion with the stirrer as used in Example 1 at a speed of 1600 revolutions per minute. To bring about an optimum distribution of the bronze powder in the liquid medium a deflector was used. After formation of a coagulum the mixture was further stirred for 10 minutes at a speed of 600 revolutions per minute and the coagulum was treated as described in Examples 1 to 3. The homogeneous mixture consisting of 40 parts by weight of polytetrafluoroethylene and 60 parts by weight of bronze had good paste extrusion properties as can be seen in the table.

EXAMPLE 5

A mixture having good paste extrusion properties was prepared under the conditions of Example 4 from 60 parts by weight of bronze and 40 parts by weight of polytetrafluoroethylene with the exception that instead of stearyl amine acetate the benzoate of oleyl amine was used as hydrophobizing agent in the liquid medium.

COMPARATIVE EXAMPLE 5

140 grams of polytetrafluoroethylene powder, which had been prepared as described in comparative Example 1, were mixed with 210 grams of bronze powder as used in Examples 4 and 5 by rolling for 20 minutes in a glass bottle on a pair of rolls. Under the conditions applied in the preceding examples the mixture could not be extruded. The pressure in the extruder exceeded the admissible maximum value of 1000 kp./cm² without an extrudate issuing from the nozzle.

Referring to the table:
o=calculated on a density of glass of 2.5 g./cc., of bronze of 8.9 g./cc., of graphite of 2.3 g./cc. and of polytetrafluoroethylene of 28 g./cc.

x=1 unobjectionable; 2 scaly surface; 3 extrudate with defects; 4 non-coherent extrudate
xx=tensile strength determined according to ASTM D-1457-62 T
xxx=elongation at break determined according to ASTM D-1457-62 T.

TABLE

Results of paste extrusion at a reduction rate of 180 of a tube 5.8 x 5.0 mm.

| Example | Filler | Type and proportion of filler | | | Extrusion test | | | | |
|---|---|---|---|---|---|---|---|---|---|
| | | Calculated on the mixture | | Parts by volume of filler for 100 parts by volume of PTFE | Evaluation, x | Extrusion pressure, kp./cm.² | Lengthwise | | Average particle size of mixture, microns |
| | | Percent by weight | Percent by volume | | | | Tensile strength | Elongation at break | |
| Ex. 1 | Glass fibers | 25 | 23.4 | 30.5 | 1-2 | 232 | 225 | 310 | 920. |
| Ex. 2 | do | 25 | 23.4 | 30.5 | 1 | 205 | 242 | 330 | 540. |
| Ex. 3 | Glass fibers plus Graphite | 20 / 5 | 18.6 / 5.4 | 31.6 | 1 | 240 | 264 | 290 | 480. |
| Comp. Ex. 1 | | | | | 1 | 172 | 275 | 330 | 610. |
| Comp. Ex. 2 | Glass fibers | 10 | 9.2 | 10.1 | 1-2 | 252 | 300 | 340 | Dry mixture. |
| Comp. Ex. 3 | do | 15 | 13.9 | 16.2 | 3 | 620 | 215 | 230 | Do. |
| Comp. Ex. 4 | do | 20 | 18.6 | 22.9 | 4 | ~700 | | | Do. |
| Ex. 4 | Bronze | 60 | 27.9 | 38.7 | 1 | 276 | 195 | 260 | 420. |
| Ex. 5 | do | 60 | 27.9 | 38.7 | 1-2 | 306 | 182 | 220 | 540. |
| Comp. Ex. 5 | do | 60 | 27.9 | 38.7 | 4 | >1,000 | | | Dry mixture. |

What is claimed is:

1. A process for the manufacture of paste extrudable powder mixtures of polytetrafluoroethylene containing up to 60% by volume, calculated on the polytetrafluoroethylene, of a filler, said process comprising suspending an inert, inorganic filler having hydrophilic surfaces in an aqueous dispersion of polytetrafluoroethylene particles and jointly coagulating the polytetrafluoroethylene and the filler to produce a mixture having particles with an average size of from 0.2 to 2 mm. and consisting of homogeneous agglomerates of filler particles and polytetrafluoroethylene, the joint coagulation being carried out in the presence of a cation-active substance containing at least one branched-chain or straight-chain aliphatic or araliphatic radical having 12 to 30 carbon atoms, and the polytetrafluoroethylene particles in the dispersion having a size of from 0.1 to 0.5 micron.

2. The process according to claim 1 wherein the filler particles have a particle size up to 300 microns or a fiber length up to 1500 microns, the cationic-active substance is an organic amine or diamine salt containing at least one straight-chain or branched-chain aliphatic or araliphatic radical having 12 to 22 carbon atoms, the cationic-active substance is present in an amount of from 0.2 to 3 parts by weight for each 100 parts filler, the polytetrafluoroethylene dispersion is of 5 to 20% strength and the filler is a member selected from the group consisting of metal powder, glass fiber, cadmium oxide, lead oxide, bismuth oxide, molybdenum disulfide, asbestos or mixtures thereof.

3. The process according to claim 1, wherein the filler is a pulverulent, inert, inorganic substance having a hydrophilic surface and a spherical or fibrous structure.

4. The process according to claim 1, wherein glass fibers are used as the filler.

5. The process according to claim 1, wherein a metal powder is used as the filler.

6. The process according to claim 1, wherein a mixture of glass fibers and a metal powder is used as the filler.

7. The process according to claim 1 containing 30 to 50 parts by volume of filler for 100 parts by volume of polytetrafluoroethylene.

8. The process according to claim 1, wherein 0.2 to 3 parts by weight of cationic-active substance are used for 100 parts by weight of filler.

9. The process according to claim 1, wherein the cationic-active substance is a member selected from the group consisting of an acetic acid salt of lauryl amine, stearyl amine and behenyl amine, the benzoic acid salt of oleyl amine, and the diacetate of stearylpropylene-diamine.

References Cited

UNITED STATES PATENTS

| 2,891,921 | 6/1959 | Kumneck | 260—29.6 |
| 2,976,257 | 4/1961 | Daive | 260—14 |
| 3,148,234 | 9/1964 | Boyer | 269—211 |
| 2,559,752 | 7/1951 | Beng | 260—29.6 |
| 2,824,060 | 2/1958 | White | 252—12.2 |

OTHER REFERENCES

Surface Active Agents, Schwartz & Perry, Group 140, pp. 151–159, vol. I, 1958 (pp. 689–695, vol. II, 1958).

MORRIS LIEBMAN, Primary Examiner

R. ZAITLEN, Assistant Examiner

U.S. Cl. X.R.

260—42.22, 42.27, 42.55